United States Patent
Guermoud et al.

(10) Patent No.: US 8,803,904 B2
(45) Date of Patent: Aug. 12, 2014

(54) IMAGE PROCESSING METHOD

(75) Inventors: Hassane Guermoud, Cesson Sevigne Cedex (FR); Jonathan Kervec, Cesson Sevigne Cedex (FR); Emmanuel Jolly, Cesson Sevigne Cedex (FR)

(73) Assignee: Thomson Licensing, Issy les Moulineaux (FR)

( * ) Notice: Subject to any disclaimer, the term of this patent is extended or adjusted under 35 U.S.C. 154(b) by 331 days.

(21) Appl. No.: 13/496,479

(22) PCT Filed: Sep. 13, 2010

(86) PCT No.: PCT/EP2010/063385
§ 371 (c)(1),
(2), (4) Date: Mar. 15, 2012

(87) PCT Pub. No.: WO2011/032913
PCT Pub. Date: Mar. 24, 2011

(65) Prior Publication Data
US 2012/0176547 A1    Jul. 12, 2012

(30) Foreign Application Priority Data
Sep. 16, 2009 (FR) .................................. 09 56350

(51) Int. Cl.
| G09G 3/30 | (2006.01) |
| G09G 5/00 | (2006.01) |
| G09G 5/02 | (2006.01) |
| G09G 3/16 | (2006.01) |
| H04N 5/57 | (2006.01) |
| H04N 9/64 | (2006.01) |
| H04N 9/12 | (2006.01) |
| G06K 9/40 | (2006.01) |
| G06K 9/36 | (2006.01) |
| G06T 11/00 | (2006.01) |

(52) U.S. Cl.
CPC .. G09G 5/02 (2013.01); H04N 5/57 (2013.01); G06T 11/001 (2013.01)
USPC ........... 345/589; 345/581; 345/606; 345/643; 345/690; 345/77; 345/687; 345/708; 345/739; 382/274; 382/276

(58) Field of Classification Search
USPC ......... 345/581, 589, 606, 616–618, 643, 204, 345/207, 690, 45, 48, 63, 77, 84; 348/68–70, 251, 269, 383, 571, 627, 348/687, 708, 739, 751, 801; 382/254, 274, 382/276
See application file for complete search history.

(56) References Cited

U.S. PATENT DOCUMENTS

| 5,991,426 | A | 11/1999 | Cox et al. |
| 2005/0253825 | A1 | 11/2005 | Kawamura et al. |
| 2007/0146257 | A1* | 6/2007 | Whitehead et al. ............. 345/84 |
| 2009/0167738 | A1* | 7/2009 | Gotanda ....................... 345/207 |
| 2010/0014281 | A1* | 1/2010 | Kim ............................. 362/97.2 |

FOREIGN PATENT DOCUMENTS

EP   1237138   9/2002

OTHER PUBLICATIONS

Search Rept: Nov. 8, 2010.

* cited by examiner

Primary Examiner — Wesner Sajous
(74) Attorney, Agent, or Firm — Robert D. Shedd; Patricia A. Verlangieri (57) ABSTRACT

The invention relates to a method for processing a video image for a display device. In order to reduce the visibility of transition regions in the processed image, the method comprises a step of application of a third video pattern to at least one part of the image, the third video pattern resulting from the spatial interleaving of a first video pattern and at least one second video pattern according to a determined model.

12 Claims, 9 Drawing Sheets

IMAGE PROCESSING METHOD

This application claims the benefit, under 35 U.S.C. §365 of International Application PCT/EP2010/063385, filed Sep. 13, 2010, which was published in accordance with PCT Article 21(2) on Mar. 24, 2011 in English and which claims the benefit of French patent application No. 0956350 filed Sep. 16, 2009.

1. SCOPE OF THE INVENTION

The invention relates to the domain of image or video processing for displaying on any type of display device for which the light source can be modulated pixel by pixel (for example PDP ("Plasma Display Panel") or by region (for example an LCD ("Liquid Crystal Display") screen with LED ("Light-Emitting Diode") back-lighting or retro-projection devices).

2. PRIOR ART

According to the prior art, such plasma or LCD screens are recognised for being high energy consumers, the plasma screens being reputed higher energy consumers than the LCD screens. For example, the nominal power of a plasma screen for which the diagonal dimension is 42 inches is of the order of 200 to 250 Watts while the nominal power of an LCD screen with back-lighting at a constant power of the same dimensions is slightly less, for example of the order of 150 Watts.

Figure 1:
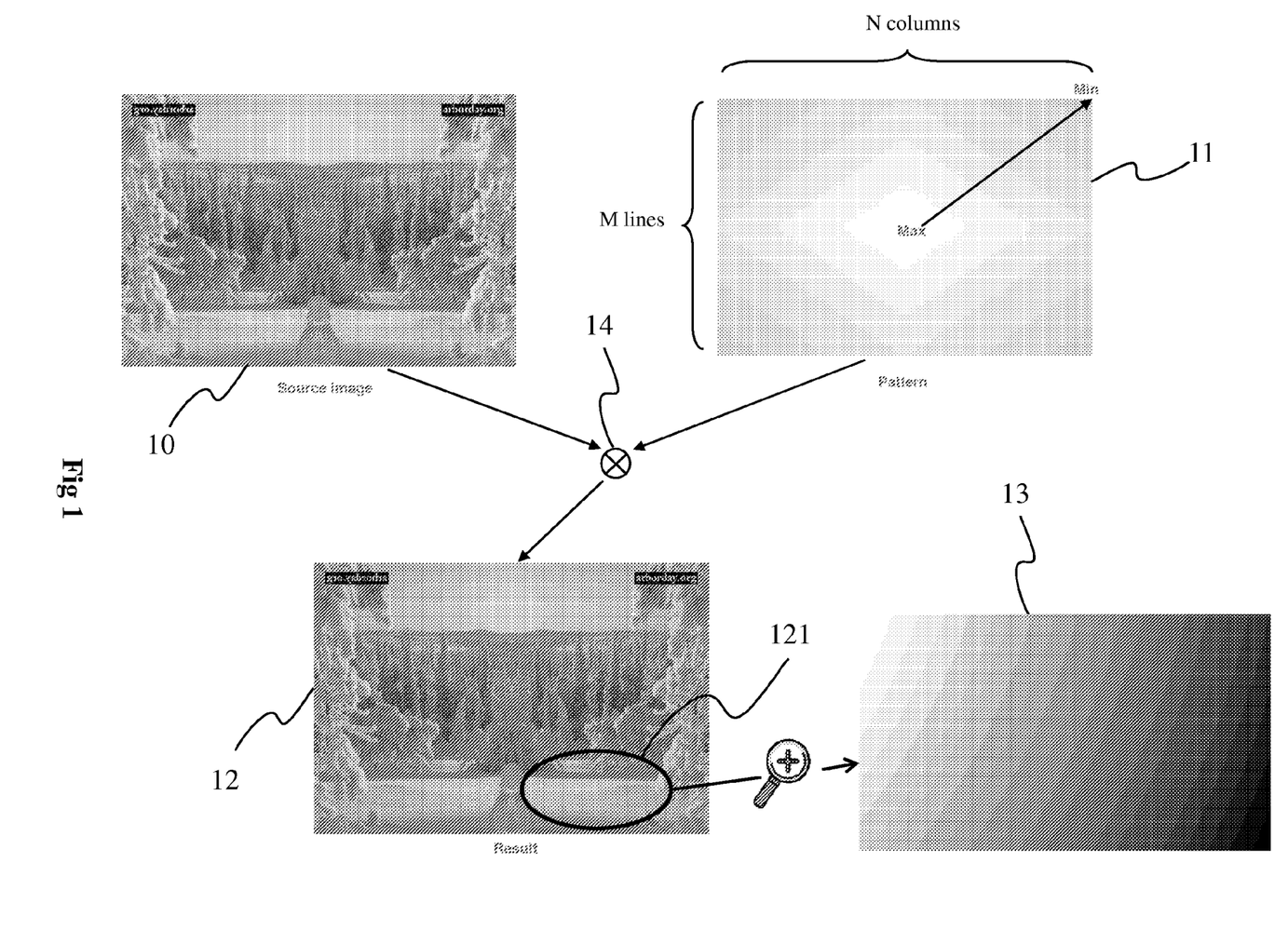
FIG. 1 shows the application of a video pattern to a source image in a processing unit of the prior art, FIG. 2 diagrammatically shows the structure of a processing unit of a display device, according to a particular embodiment of the invention.

To satisfy the recommendations of the European commission relating to the capping of electrical consumption of flat screens (whether they are of plasma, LCD or retro-projection type) that enter into force during 2010. To satisfy these recommendations, the electrical consumption of screens of the prior art must be reduced. The French patent application FR0954109 filed Jun. 18, 2009 in the name of Thomson Licensing proposes to reduce the electrical consumption of screens of the prior art by applying a video pattern to a video sequence in a way to conserve a maximum luminous intensity in the region or regions of interest of images of the video sequence while reducing the luminous intensity in accordance with distance from the region or regions of interest in the images of the video sequence. FIG. 1 shows the application of a video pattern to a source image according to the patent application FR0954109. A video pattern 11 corresponding for example to a matrix of M lines by N columns (M and N corresponding for example respectively to the number of lines and columns of the source image) is applied to a source image 10. The pattern 11 is determined in such a way that the video level takes a maximum value Max at the centre of the pattern, for example equal to 255, and takes a minimum value Min in the corners of the pattern, that is to say in the regions of the pattern furthest from the centre of the pattern. The minimum value corresponds for example to a percentage of the maximum value Max. Thus, the convolution product (symbolized by the multiplier 14) of the source image 10 by the function (for example of Gaussian or bilinear type) enabling the video pattern 11 to be obtained provides as a result an output image 12 for which the video level will have a maximum value at its middle (or at the level of the region or regions of interest) and a minimum value in the corners (or at the level of the regions furthest from the regions of interest), in accordance with the video pattern 11.

Figure 4A:
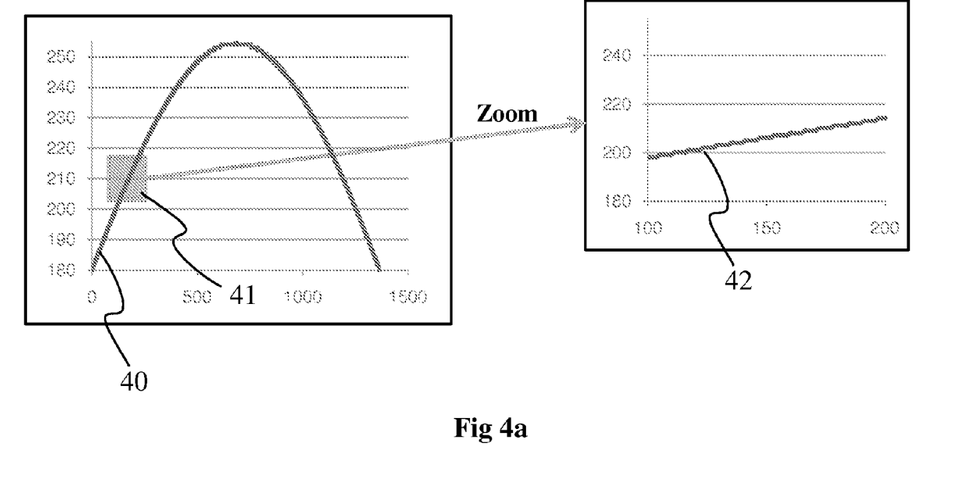
FIG. 4a shows an attenuation function used in a processing unit of the prior art or in a processing unit of FIG. 2, according to an embodiment of the invention.

For some video sequences, containing notably large uniform regions, transition regions appear due to the gradient of the video pattern applied to the source video sequence. FIG. 4a shows a curve representative of a function of Gaussian type 40 used to define the video pattern 11. By enlargement of a part 41 of the curve 40, it is possible to see the gradient jumps 42 at the origin of display faults. These faults are more or less visible according to the number of bits that a screen can use for the display of a video sequence. The lower the number of bits used, the greater the faults will be. These display faults are also known under the name of quantization faults and are illustrated by the pattern 13 that corresponds to an enlargement of a quasi-uniform region 121 of the output image 13, displayed in levels of gray. The pattern 13, for which the contrast was increased in a way to clearly display the gray level transition regions, shows generally the display faults linked to the problem of quantization of screens of the prior art.

3. SUMMARY OF THE INVENTION

The purpose of the invention is to overcome at least one of these disadvantages of the prior art.

More particularly, the purpose of the invention is to reduce the visibility of gray level transition regions on the display screen.

The invention relates to a method for processing a video image for a display device. The method comprises a step of application of a third video pattern to at least one part of the image, the third video pattern resulting from the spatial interleaving of a first video pattern and at least a second video pattern according to a determined model.

According to a particular characteristic, the first video pattern is generated from a first Gaussian type function having a first standard deviation.

Advantageously, the at least one second video pattern is generated from at least one second Gaussian type function having a second standard deviation different from the first standard deviation.

According to a specific characteristic, the method comprises a step of generation of the first video pattern and of the at least one second video pattern from an initial video pattern.

Advantageously, the first video pattern and the at least one second video pattern are generated by application of at least one weighting coefficient to the first initial video pattern.

According to a particular characteristic, the spatial interleaving is carried out according to two dimensions.

According to another characteristic, the first pattern and the at least second pattern are generated in a way to conserve a maximum luminous intensity in at least one region of the at least one part of the image on which the third pattern is applied and to attenuate the luminous intensity in the rest of the at least one part of the image, the at least one region comprising at least one pixel.

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

FIG. 1 shows the processing of a source video image 10 to which is applied a video pattern 11 according to the prior art and notably as described in the French patent application FR0954109. The result of the application of the pattern 11 to the image 10 is shown by the resultant video image 12. The pattern 11 has the same dimensions as the source image to which it is applied. Advantageously, the pattern 11 is a matrix of dimensions M*N (M lines by N columns) with a number of elements equal to the number of pixels of images 10 and 12. To each element on the matrix M*N representative of the pattern 11 is thus associated a pixel of the source image 10. The pattern 11 is determined in a way such that the video level takes a maximal value Max at the centre of the pattern, for example equal to 255, and takes a minimal value Min in the corners of the pattern, that is to say in the areas of the pattern furthest from the centre of the pattern. The minimal value corresponds to a percentage of the maximal value Max and is for example equal to 60, 70, 80 or 90% of the maximal value Max. In other words, the element placed in the centre of the matrix representative of the pattern 11 has as a value the maximal value Max of video level, for example 255, and the elements placed in the four corners of the matrix have as a value the minimal value Min of the video level. The video level associated with each of the elements of the matrix representative of the pattern 11 is for example obtained using a Gaussian or bilinear type function represented by the multiplier 14.

According to a variant, the elements of the matrix M*N representative of the pattern 11 take weighting coefficients as a value. The element placed in the centre of the matrix advantageously takes as a value a maximal weighting coefficient equal to 1 and the and the elements furthest from the element of the centre, that is to say the elements positioned in the corners of the matrix, take as a value a same minimal weighting coefficient corresponding to X % of the maximal weighting coefficient, X having for example a value of 60, 70, 80 or 90%.

Advantageously, the centre of the pattern having as a value the video level maximal value or the maximal weighting coefficient corresponds to an element of the matrix M*N, namely the element placed at the intersection of the middle line and the middle column. According to a variant, the centre of the pattern corresponds to a set of elements of the matrix, for example a circle centred on the element of the centre of the matrix having as a radius R elements (R being for example equal to 5, 10, 20, 50 or 100 elements), a square centred on the element of the centre of the matrix having sides of length L elements (L being for example equal to 5, 10, 20, 50 or 100 elements), a rectangle centred on the element of the centre of the matrix having sides of length L elements and of width I elements, or any other geometric form centred on the central element of the matrix.

The invention will now be described in reference to a particular embodiment of a method for image processing wherein a video pattern, called the third video pattern, resulting from spatial interleaving, according to a determined interleaving model, of a first video pattern and of one or several second video patterns applied to all or part of a source image. The spatial interleaving according to a determined model of several video patterns advantageously enables the visibility of transition regions to be reduced as described with respect to FIG. 1. The first and second video patterns are for example, but not exclusively, of the type of the video pattern 11 of FIG. 1.

Figure 2:
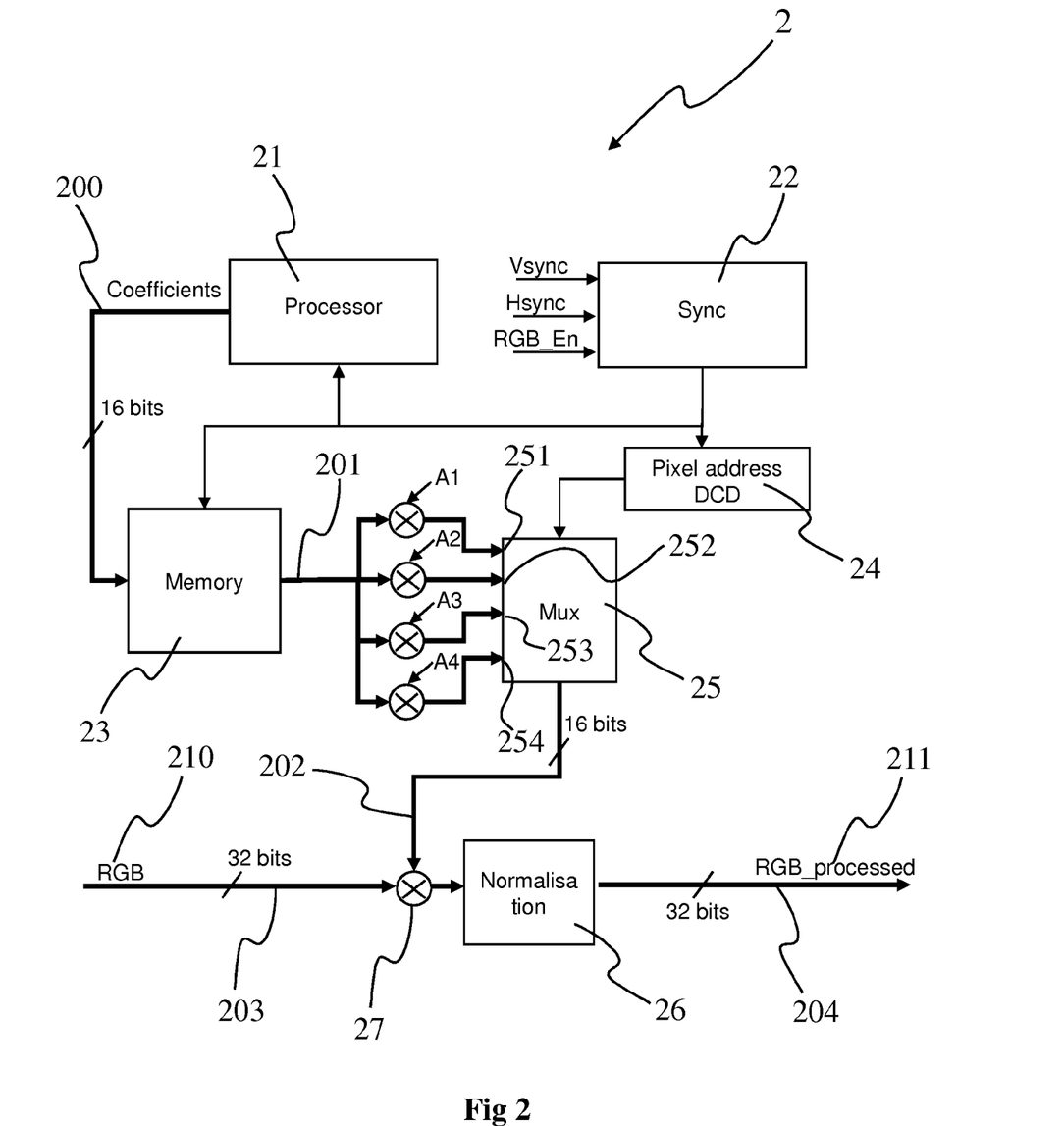

FIG. 2 diagrammatically shows a first hardware embodiment of a processing unit 2 of a display device. The processing unit 2 takes for example the form of a programmable logical circuit of type FPGA (Field-Programmable Gate Array) for example, ASIC (Application-Specific Integrated Circuit) or a DSP (Digital Signal Processor).

The processing unit 2 comprises the following elements:
 a processor 21,
 a memory 23,
 a synchronization unit 22,
 a multiplexer 25 with four inputs 251 to 254, each input being preceded by a multiplier,
 an address decoder 24,
 a normalization unit 26,
 a multiplier 27,
 data buses 200, 201, 202, 203, 204.

The processor 21 contains a function enabling an initial video pattern to be generated according to the criteria entered via for example an MMI (Man Machine Interface) interface not shown. The criteria correspond for example to the region of the initial pattern for which the video level is maximal, to the desired maximal value, to the minimal value corresponding to a percentage X of the maximal value. The processor 21 generates an initial video pattern represented by a matrix comprising as many elements as pixels contained in the image to be processed. If the image to be processed 210 is an image comprising M lines and N columns, the matrix representing the initial video pattern will also comprise M lines and N columns of elements. The matrix generated is transmitted to the memory (for example a RAM (Random Access Memory) or flash type memory 23 via a bus 200 connecting the processor 21 to the memory 23 the content of the memory 23 is then transmitted to a multiplexer 25 input. Each element of the memory 23 is weighted with four weighting coefficients A1, A2, A3 or A4 (respectively referenced 251 to 254) in parallel, each weighting corresponding to a multiplexer 25 input, to form a first video pattern (weighted with the coefficient A1), and three second video patterns (respectively weighted with the coefficients A2, A3 and A4). An address decoder 24, connected at input to a synchronisation unit 22 and at output to a multiplexer 25, routes the output of the multiplexer 25 so that it applies to a pixel of an image to be processed 210 an element of the memory 23 weighted by a weighting coefficient A1, A2, A3 or A4 via the multiplier 27, and this for each pixel of the image to be processed 210. The selection of an input 251 to 254 of the multiplexer 25 by the address decoder to apply the elements of the memory 23 weighted to the pixels of the image to be processed 210 advantageously follows a sequence of selections of weighting coefficients programmed in the address decoder 24. The application of a given element of the matrix contained in the memory 23 to the pixel associated with the image to be processed, the coordinates of the element in the matrix being identical to the coordinates of the associated pixel in the input image 26, is synchronised by the synchronisation unit 22 receiving at input signals of vertical synchronisation (Vsync), horizontal synchronisation (Hsync) and a signal (RGB_en) corresponding to the active pixels of the source image 210. The weighting coefficient applied to the element of the memory 23 before this latter is applied to a pixel of the image to be processed is selected by the decoder 24 according to the address of the pixel to be processed and according to the sequence of weighting coefficients stored in the address decoder 24. According to a variant, the address decoder 24 contains several sequences of weighting coefficients, the sequence to be applied depending on the address (in X and in Y) of the pixel of the image to be processed 210. Advantageously, the sequence or sequences of weighting coefficients are repeated cyclically. The sequence or sequences of weighting coefficients advantageously depending on the display screen type, for example according to processes applied to the images (for example "blurring") of a given display screen.

Here is an example of a selection sequence of weighting coefficients applied to the elements of the memory 23 according to the address of the pixel of the image to be processed:

TABLE 1

Selection sequence of weighting coefficients

| Line | \multicolumn{6}{c}{Column} |
| | C1 | C2 | C3 | C4 | C5 | C6 |
| --- | --- | --- | --- | --- | --- | --- |
| L1 | A1 | A2 | A3 | A4 | A3 | A2 |
| L2 | A3 | A4 | A3 | A2 | A1 | A2 |
| L3 | A2 | A1 | A2 | A3 | A4 | A3 |
| L4 | A4 | A3 | A4 | A1 | A2 | A1 |
| L5 | A2 | A1 | A2 | A3 | A4 | A3 |
| L6 | A3 | A4 | A3 | A2 | A1 | A2 |

According to this example, the selection sequence of weighting coefficients is a 6×6 matrix. During the application of elements of the memory 23 to the image to be processed, the $1^{st}$ pixel of the image to be processed is selected, that is to say the pixel of the first line and the first column of the display screen. Via the synchronisation unit, the $1^{st}$ element of the memory corresponding to this $1^{st}$ pixel, that is to say the element having the same coordinates as the pixel is selected (first line, first column) and is transmitted to the four inputs of the multiplexer 25, a weighting coefficient A1, A2, A3 or A4 being applied to this $1^{st}$ element at the level of each of the four inputs of the multiplexer. Then a decoding unit 24 selects the input of the multiplexer 25 according to the matrix representative of the selection sequence of weighting coefficients that it contains. In accordance with the matrix above, the decoding unit selects the first input of the multiplexer, that is to say that corresponding to the coefficient A1. Thus, the first element of the memory 23 is weighted with the coefficient A1 before being applied to the first pixel of the image to be processed 210.

Then the second pixel of the image to be processed is selected, for example that of the first line and the second column. Via the synchronisation unit, the second element of the memory corresponding to this second pixel, that is to say the element having the same coordinates as the pixel is selected (first line, second column) is selected and is transmitted to the four inputs of the multiplexer 25, a weighting coefficient A1, A2, A3 or A4 being applied to this second element at the level of each of the four inputs of the multiplexer. Then a decoding unit 24 selects the input of the multiplexer 25 according to the matrix representative of the selection sequence of weighting coefficients that it contains. In accordance with the matrix above, the decoding unit selects the second input of the multiplexer, that is to say that corresponding to the coefficient A2. Thus, the second element of the memory 23 is weighted with the coefficient A2 before being applied to the second pixel of the image to be processed 210.

The same process is reiterated for each pixel of the image to be processed 210. The six first pixels of the first line have thus applied the six first elements of the first line of the memory respectively weighted with the coefficients A1, A2, A3, A4, A3, A2, then the six first pixels of the second line have applied the six first elements of the second line of the memory 23 weighted respectively with the coefficients A3, A4, A3, A2, A1, A2 in accordance with the selection matrix of coefficients of the decoding unit 24 and so on. The coefficients selection matrix is thus applied cyclically, which is to say that the input image is divided into blocks of 6×6 pixels (or in an equivalent way the memory is divided into blocks of 6×6 elements) and that the same sequence of 6×6 coefficients is applied to each of the blocks of 6×6 pixels (respectively 6×6 elements). The size of the coefficients selection sequence matrix advantageously depends on the screen type and is for example 8×1 or 12×2 or 16×16, etc.

In other words, the selection of inputs of the multiplexer according to a selection sequence stored in the address decoder 24 and according to the address of a pixel assures a spatial interleaving of several video patterns (that is to say interleaving of a first video pattern and three second video patterns), a video pattern corresponding to a matrix of M×N elements generated from a function contained in the processor 21 to which is applied a weighting coefficient. In the embodiment of FIG. 2, the address decoder 24 assures the spatial interleaving of four video patterns to form a third video pattern applied to the input image 210.

The memory 23 and the multiplexer 25 are connected together via a 16 bit data bus. The input signal 210 is transmitted to the multiplier 27 via a data bus of for example of 32 bits (the number of bits to be transmitted in parallel being 30 effective bits, each RGB (Red, Green, Blue) component being coded on 10 bits). The bus 201 is dimensioned at 16 bits as a single element coded on 10 bits of the matrix contained in the memory 23 is to be applied to the three RGB components defining each pixel of the input image 210. The bus 201 must then be capable of transmitting 10 bits in parallel, a 16 bit bus is placed between the memory 23 and the multiplexer 25. A normalisation unit 26 is placed at the output of the multiplexer 27 to return to 30 bits the coded signal from the multiplication of the input signal RGB 210 coded on 30 bits and the signal on 10 bits representative of elements of the third video pattern, the signal at output of the normalisation unit 24 being the output signal RGB_processed 211 representative of video images to be displayed on the display device: the dynamics of the output signal RGB_processed 211 must be identical to the dynamics of the input signal RGB 210. The output signal 211 corresponds to the input image 210 to which was applied the third video pattern from the spatial interleaving of the first and second video patterns.

In the case where the initial video pattern has a maximal video level in its centre and a minimal video level in the regions furthest from the centre of the pattern, the first and second video patterns having the same characteristics as these first and second video patterns are identical to the initial video pattern, to the nearest weighting coefficient. Thus, the third video pattern from the spatial interleaving of the first video pattern and the second video pattern also has a maximal video level in its centre and a minimal video level in the regions furthest from the centre of the pattern. The output image 211 will have a luminous intensity identical to that of the input image at the centre of the image and a reduced luminous intensity in the regions of the image distant from the centre of the image. The reduction in the luminous intensity of pixels of the image falls progressively from the centre of the image towards the periphery of the image according to the function used (for example Gaussian type function or bilinear interpolation type function) to generate the initial video pattern in the processor 21. The energy required to display the output image is thus less than the energy that would be necessary to display the input image not processed by the processing unit 2.

According to a variant, the memory 23 is placed outside of the processing unit 2. In fact, the memory 23 contains as many elements coded on 10 bits as there are pixels in the input image 26. For an image of resolution 1920×1080 (containing therefore 2073600 pixels), the memory must have a storage capacity of approximately 2.6 MB. A RAM or flash memory with such a storage capacity is generally not integrated into a processing unit 2 of FGPA or ASIC type.

Figure 3:
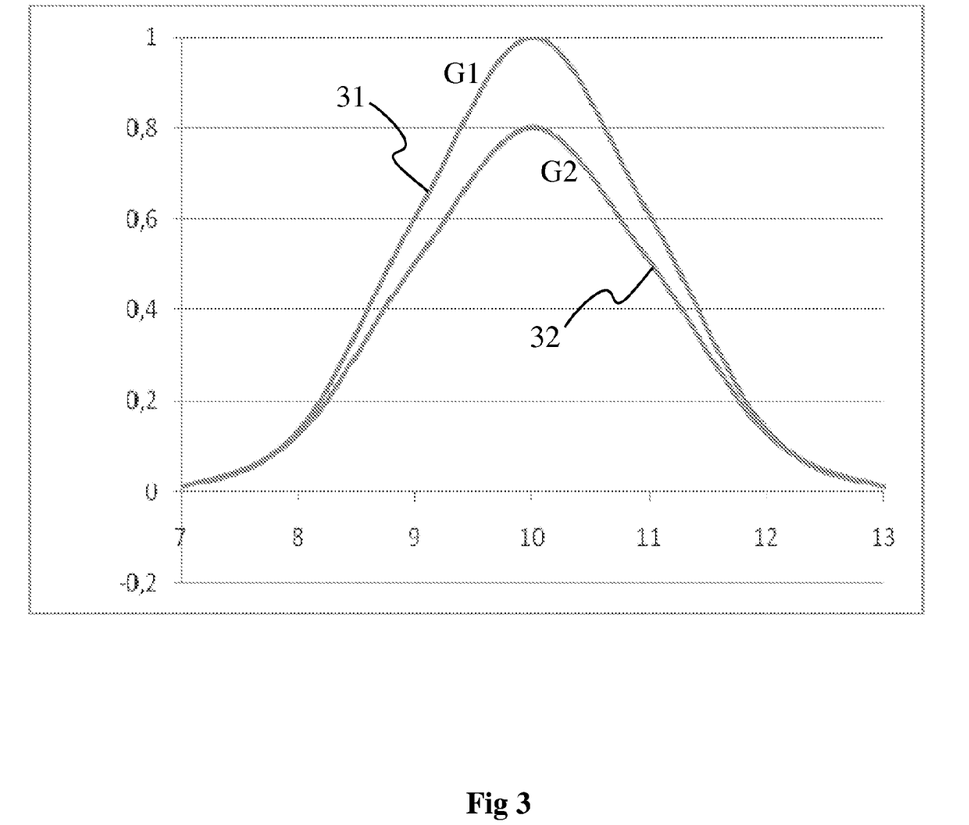
FIG. 3 shows two attenuation functions used in the processing unit of FIG. 2 or FIG. 5, according to an embodiment of the invention.
Figure 5:
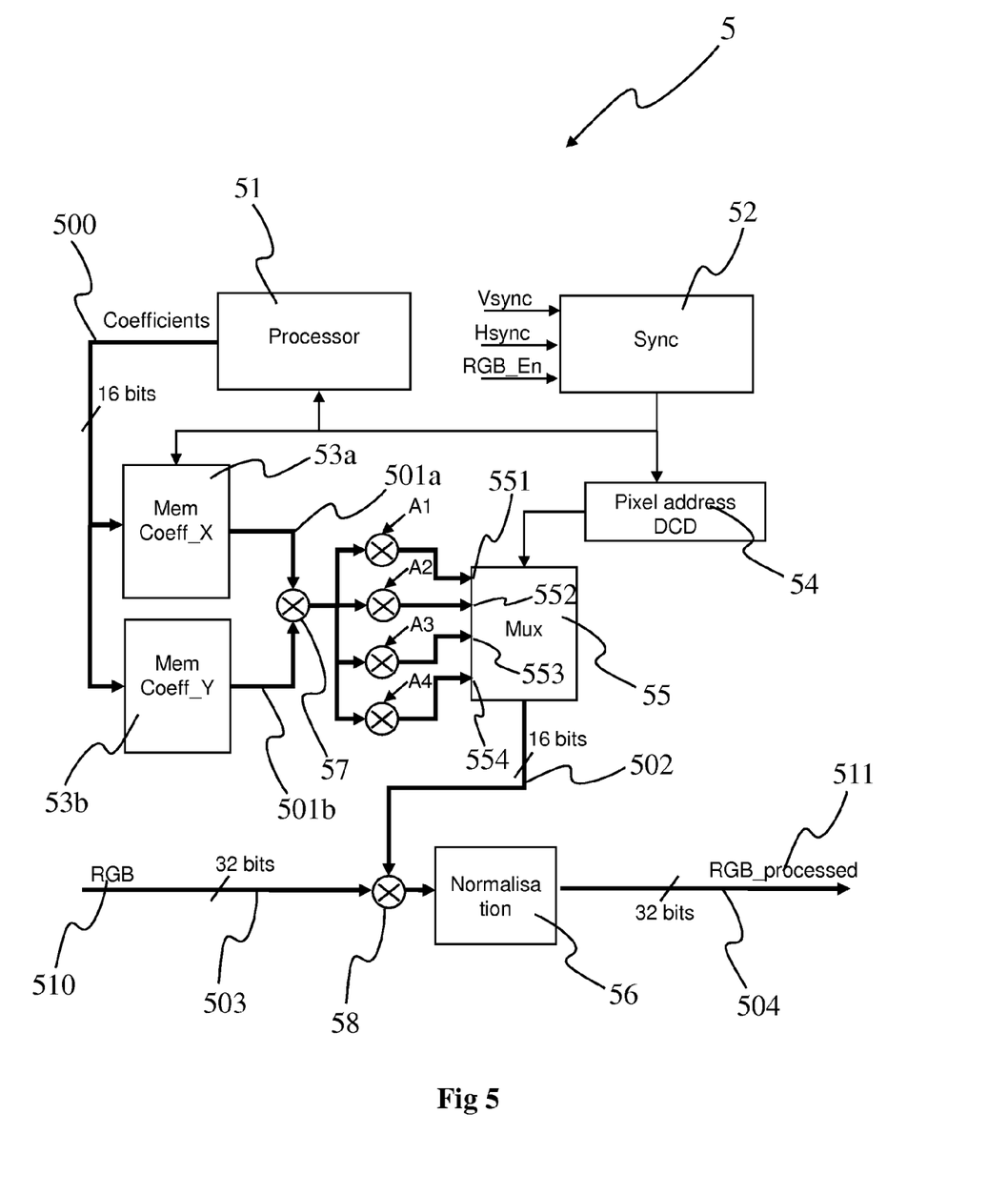

FIG. 3 shows two curves representative of attenuation functions used in the processing unit of FIG. 2 or FIG. 5, according to an embodiment of the invention. The curve G1 31 advantageously is representative of the function programmed in the processor 21, serving for the generation of the initial video pattern. The function used to generate the initial video pattern and the elements that comprise it is advantageously of Gaussian type, with for example as a formula:

$$f_1(x, y) = K.\exp\left(-\left[\frac{(x-x_0)^2}{2\sigma_x^2} + \frac{(y-y_0)^2}{2\sigma_y^2}\right]\right) \quad \text{formula 1}$$

where K is a determined coefficient, for example 255 corresponding to the maximal video level, x and y corresponding respectively to the abscissa and ordinate of an element of the video pattern, $x_0$ and $y_0$ corresponding respectively to the coordinates of the centre of the area in which the luminous intensity is conserved at it maximal value, $\sigma_x$ and $\sigma_y$ corresponding respectively to the variance in x and the variance in y of the Gaussian.

The curve G2 32 is for its part advantageously representative of the function representative of the first video pattern or one of the three second video patterns of FIG. 2. The curve G2 has for example as a function the function of the curve G1 weighted by A1 or the function of G1 weighted by one of the coefficients A2, A3 or A4. Thus the following formula type is obtained for G2:

$$f_2(x,y) = A1 f_1(x,y), \quad \text{formula 2}$$

A1 being for example equal to 0.9 to 0.8 or to 0.6. According to a variant, A1=1 and one of the first and second video patterns is identical to the initial video pattern.

FIG. 4 shows a Gaussian type attenuation function used in a processing unit of the prior art and also shows a G1 type attenuation function shown in FIG. 3 serving to generate the initial video pattern. By enlargement of a part 41 of this curve 40, jumps in gradient 42 are observed at the origin of transition regions visible notably in the parts having a uniform video level of an image processed with the video pattern generated from such an attenuation function.

Figure 4B:
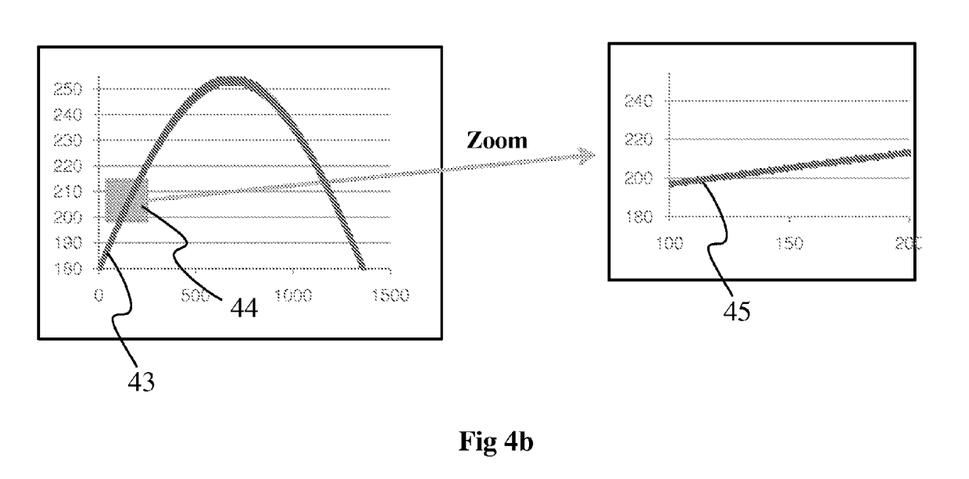
FIG. 4b shows the result of the interleaving of attenuation functions implemented in the processing unit of FIG. 2, according to an embodiment of the invention, FIGS. 5 and 6 diagrammatically show the structure of a processing unit of a display device, according to two particular embodiments of the invention.

FIG. 4b shows the result of the interleaving of several Gaussian type attenuation functions and advantageously the result of interleaving of the function representative of the first video pattern and of three functions representative of three second video patterns of FIG. 2. By enlargement of a part 44 of the curve 43 from the result of the spatial interleaving of curves representative of functions representative of first and second video patterns, it can be seen that the jumps in gradient 45 are much attenuated in comparison with those present for the unique curve representative of a single attenuation function. The spatial interleaving of several video patterns according to a determined sequence offers the advantage of reducing the visibility of display faults such as the appearance of transition regions visible in the uniform parts of an image processed with one attenuation function and as shown in FIG. 1.

FIG. 5 diagrammatically shows a second hardware embodiment of a processing unit 5 of a display device. The processing unit 5 takes for example the form of a programmable logical circuit of type FPGA for example or ASIC or a DSP.

The processing unit 5 comprises the following elements:
a processor 51,
Two memories 53a and 53b,
a synchronization unit 52,
a multiplexer 55 with four inputs 551 to 554,
an address decoder 54,
a normalization unit 56,
two multiplexers 57 and 58,
data buses 500, 501a, 501b 502, 503, and 504.

The processor 51, the synchronization unit 52, the address decoder 54, the multiplier 58, the normalization unit 56 and the data buses 500 to 504 assure the same functions as respectively the processor 21, the synchronization unit 22, the address decoder 24, the multiplier 27, the nommalization unit 26 and the data buses 200 to 204 described with respect to FIG. 2 and will not be further described in detail hereafter. The processor 51 uses the mathematical properties of certain attenuation functions, particularly the Gaussian type functions to generate the components in X of the initial video pattern on one hand and the components in Y of the initial video pattern on the other hand. As a reminder, a Gaussian type function as illustrated by the example in FIG. 3 has a general formula of type:

$$f(x, y) = K \cdot \exp\left(-\left[\frac{(x-x_0)^2}{2\sigma_x^2} + \frac{(y-y_0)^2}{2\sigma_y^2}\right]\right),$$

that can be broken down in the following way:

$$f(x, y) = K \cdot \exp\left(-\frac{(x-x_0)^2}{2\sigma_x^2}\right) \cdot \exp\left(-\frac{(y-y_0)^2}{2\sigma_y^2}\right) \quad \text{formula 3}$$

The first term $$\exp\left(-\frac{(x-x_0)^2}{2\sigma_x^2}\right)$$

corresponds to the components in X of the initial video pattern and the second term $$\exp\left(-\frac{(y-y_0)^2}{2\sigma_y^2}\right)$$

corresponds to the components in Y of the initial video pattern.

The processor 51 generates on one hand the components in X of the initial video pattern and transmits them for storage in a first memory 53a and on the other hand the components in Y of the initial video pattern and transmits them for storage in a second memory 53b. Advantageously, the second memory 53b is identical, in terms of storage capacity and or structure, to the first memory 53a. For an image of resolution 1920× 1080 (thus containing 1920 lines and 1080 columns, or 1920 values in X and 1080 values in Y), two memories 53a and 53b of 2000 words of 16 bits each are sufficient for the storage of components in X and Y. Such a hardware embodiment of a processing unit offers the advantage to be able to use the memory embedded in an FPGA (or ASIC) circuit without having to add RAM or flash type memory to the exterior of the circuit. The application of an element of the initial video pattern to a pixel of the image to be processed is carried out by selection of the component in X of the initial video pattern in the memory 53a corresponding to the coordinate X of the pixel to be processed and by selection of the component Y of the initial video pattern in the memory 53b corresponding to the coordinate Y of the pixel to be processed. The value of the component in X is then multiplied to the value of the component in Y via the multiplier 57. The selection of components in X and in Y in the memories 53a and 53b from the address of the pixel to be processed is synchronised via the synchronisation unit 52 that is linked to the memories 53a and 53b. The element of the initial video pattern to be applied to the selected pixel is then weighted by the coefficients A1, A2, A3 and A4 to form a first video pattern and the three second video patterns at input to the multiplexer 55. The address decoder 54 then selects one of these four inputs according to the address of the pixel to be processed and a selection sequence of weighting coefficients A1 to A4 programmed and registered in the address decoder 54. The element of the initial video pattern weighted with one of the weighting coefficients A1 to A4 selected by the address decoder 54 is then transmitted to the multiplier 58 to be applied to the pixel corresponding to the image to be processed 510 to form the processed image 511 at the output of the normalisation unit 56. As in the processing unit 2 of FIG. 2, the address decoder 54 carries out here a spatial interleaving (according to a predetermined spatial sequence) of the first video pattern and the three second video patterns to form a third video pattern that is applied to the input signal RGB 510 representative of video images to be processed.

Figure 6:
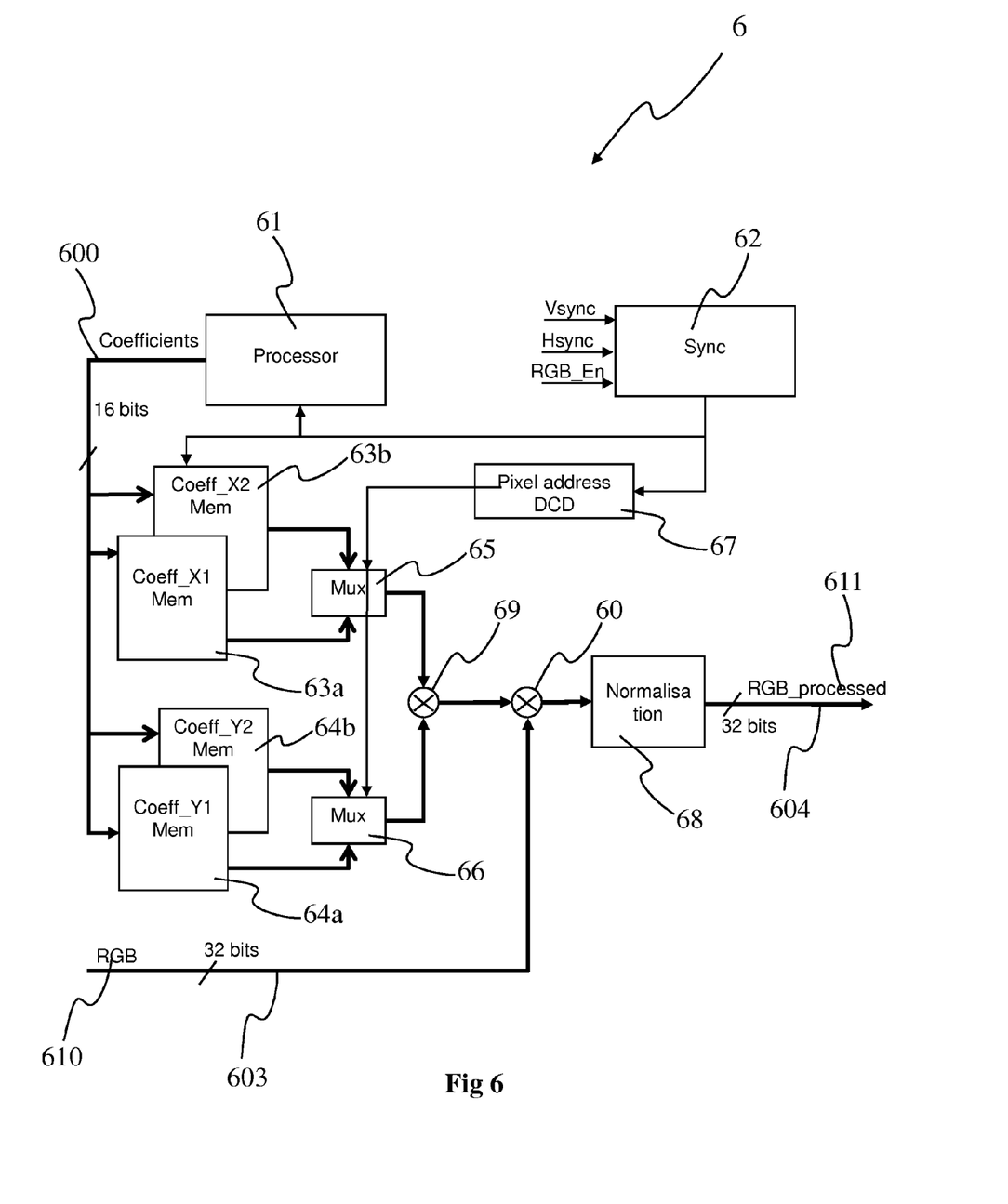

FIG. 6 diagrammatically shows a third hardware embodiment of a processing unit 6 of a display device. The processing unit 6 takes for example the form of a programmable logical circuit of FPGA type for example or ASIC or a DSP.

The processing unit 6 comprises the following elements:
a processor 61,
four memories 63a, 63b and 64a, 64b
a synchronization unit 62,
two multiplexers 65 and 62 each with two inputs,
an address decoder 67,
a normalization unit 68,
two multiplexers 60 and 69,
data buses 600, 603, 604, The processor 61, the synchronization unit 62, the address decoder 64, the multiplier 60, the normalization unit 68 and the data buses 600, 603 and 604 assure the same functions as respectively the processor 21, the synchronization unit 22, the address decoder 24, the multiplier 27, the normalization unit 26 and the data buses 200, 203 and 204 described with respect to FIG. 2 and will not be further described in detail hereafter.

The processor 61 contains two attenuation functions enabling an initial video pattern and a second video pattern to be generated according to the criteria entered via for example an MMI (Man Machine Interface) interface not shown. The criteria correspond for example to the region of the initial pattern for which the video level is maximal, to the desired maximal value, to the minimal value corresponding to a percentage X of the maximal value and are valid for the two functions. Advantageously, the Gaussian type functions have two different standard deviations. The first function has for example a formula:

$$f_1(x, y) = K \cdot \exp\left(-\left[\frac{(x-x_0)^2}{2\sigma_{1x}^2} + \frac{(y-y_0)^2}{2\sigma_{1y}^2}\right]\right) \quad \text{formula 4}$$

that can be broken down in the following way:

$$f_1(x, y) = K \cdot \exp\left(-\frac{(x-x_0)^2}{2\sigma_{1x}^2}\right) \cdot \exp\left(-\frac{(y-y_0)^2}{2\sigma_{1y}^2}\right) \quad \text{formula 5}$$

The second function has for example a formula:

$$f_2(x, y) = K \cdot \exp\left(-\left[\frac{(x-x_0)^2}{2\sigma_{2x}^2} + \frac{(y-y_0)^2}{2\sigma_{2y}^2}\right]\right) \quad \text{formula 6}$$

that can be broken down in the following way:

$$f_2(x, y) = K \cdot \exp\left(-\frac{(x-x_0)^2}{2\sigma_{2x}^2}\right) \cdot \exp\left(-\frac{(y-y_0)^2}{2\sigma_{2y}^2}\right) \quad \text{formula 7}$$

The first terms of each of the formulas 5 and 7

$$\exp\left(-\frac{(x-x_0)^2}{2\sigma_{1x}^2}\right) \text{ and } \exp\left(-\frac{(x-x_0)^2}{2\sigma_{2x}^2}\right)$$

correspond to components in X of respectively the first video pattern and the second video pattern and the two terms $$\exp\left(-\frac{(y-y_0)^2}{2\sigma_{1y}^2}\right) \text{ and } \exp\left(-\frac{(y-y_0)^2}{2\sigma_{2y}^2}\right)$$

correspond to the components in Y of respectively the first video pattern and the second video pattern.

The processor 61 generates on one hand the components in X of each of the first and second video patterns and transmits them for storage into respectively a first memory 63a and a second memory 63b, and on the other hand the components in Y of each of the first and second video pattern and transmits them for storage into respectively a third memory 64a and a fourth memory 64b. Advantageously, the first, second, third and fourth memories 63a, 63b, 64a, 64b are identical in terms of storage capacity and/or structure.

For each pixel of the image 610 to be processed, that is to say for each address (X,Y) of pixels of the image 610, the component in X and in Y of a first element of the first video pattern are selected respectively in the memories 63a and 64a, the position X and Y of components X and Y in the memories 63a and 64a corresponding to the address (X,Y) of the pixel to be processed. Each of these components X and Y of the first element of the first video pattern are transmitted to an input of a multiplexer 65. In the same way, the components in X and Y of a second element of the second video pattern are selected in the memories 63b and 64b to be transmitted each to an input of a multiplexer 66. The selection of components in X and in Y in the memories 63a, 63b and 64a, 64b from the address of the pixel to be processed is synchronised via the synchronisation unit 62 that is connected to the memories 63a, 63b and 64a, 64b.

The address decoder 67 then selects one of the two inputs of the multiplexer 65 according to the address of the pixel to be processed and a selection sequence of attenuation functions (function $f_1$ having a first standard deviation or function $f_2$ having a second standard deviation) registered in the address decoder 67. If the address decoder 67 selects the input corresponding to the component X of the function $f_1$ of the multiplexer 65 then the address decoder 67 selects the input corresponding to the component Y of the function $f_1$ of the multiplexer 66. If the address decoder 67 selects the input corresponding to the component X of the function $f_2$ of the multiplexer 65 then the address decoder 67 selects the input corresponding to the component Y of the function $f_2$ of the multiplexer 66. The multiplexers 65 and 66 transmit then the components in X and Y of the function $f_1$ (or of the function $f_2$) selected by the address decoder 67 for multiplication of these components together via a multiplier 69. The result of the multiplication is then transmitted to the multiplier 60 for multiplication with the video level of the pixel corresponding to the image to be processed 610. After processing by a normalisation unit 68, a processed image is obtained at the output 611, that is to say an image for which the luminous level is maximal in a region of the image (for example at its centre) and for which the luminous level is less great than that of the input image 610 in the rest of the image, the luminosity varying according to the attenuation function used. The address decoder carries out a spatial interleaving (according to a predetermined spatial sequence) of attenuation functions f1 and f2, that is to say a spatial interleaving of first and second video patterns to form a third video pattern that is applied to the input signal RGB 610 representative of video images to be processed.

Figure 7:
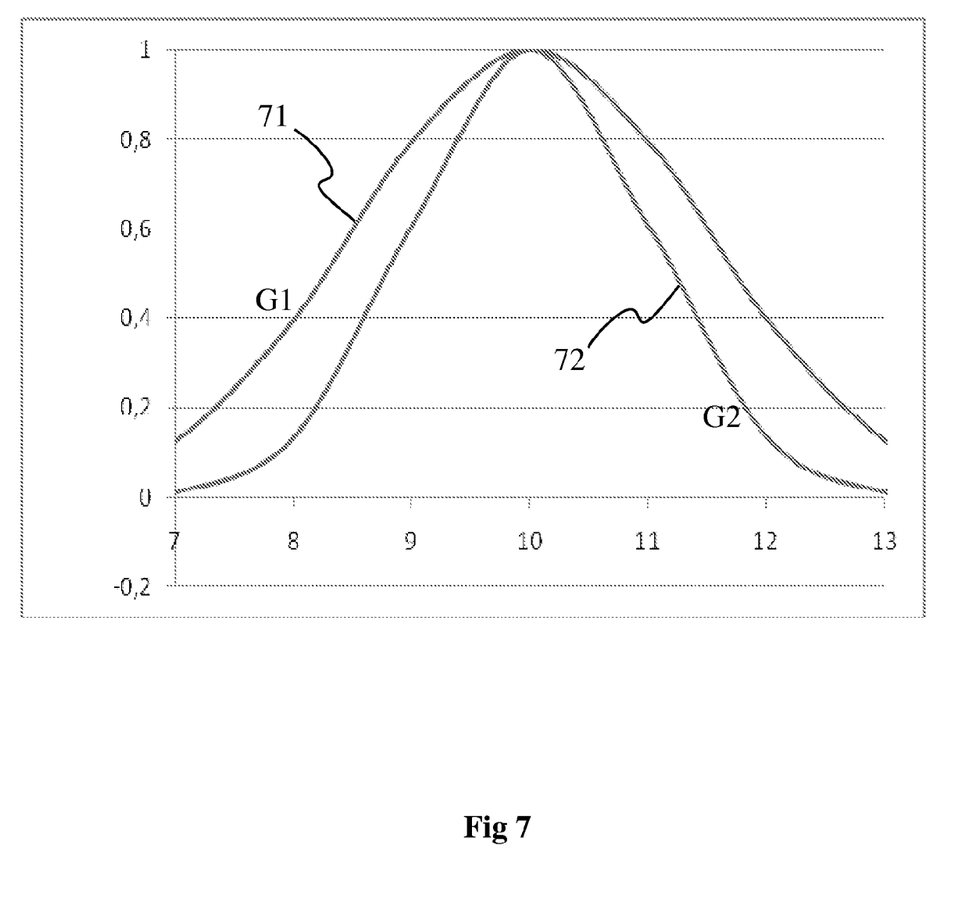
FIG. 7 shows two attenuation functions used in the processing unit of FIG. 6, according to an embodiment of the invention.

FIG. 7 shows two curves representative of attenuation functions used in the processing unit of FIG. 6, according to an embodiment of the invention. The curve G1 71 is for example representative of the function $f_1$ serving in the generation of a first video pattern and the curve G2 72 is for example representative of the function $f_2$ serving in the generation of the second video pattern. The curve G1 has a first standard deviation and the curve G2 has a second standard deviation that is different from the first standard deviation. The curves G1 and G2 advantageously have identical characteristics, for example they have a maximum in a same point and a minimum in the same points. Having identical characteristics enables a third uniform video pattern to be obtained (from spatial interleaving of the first video pattern and the second video pattern), that is to say with a maximum in a same point and minima in the same points in order to obtain a maximum of luminosity in the processed image in a given region and greater and greater luminous attenuations as distance from the maximal region of luminosity increases in a processed image increases, without disparity in the attenuation gradient of the luminous intensity.

Figure 8:
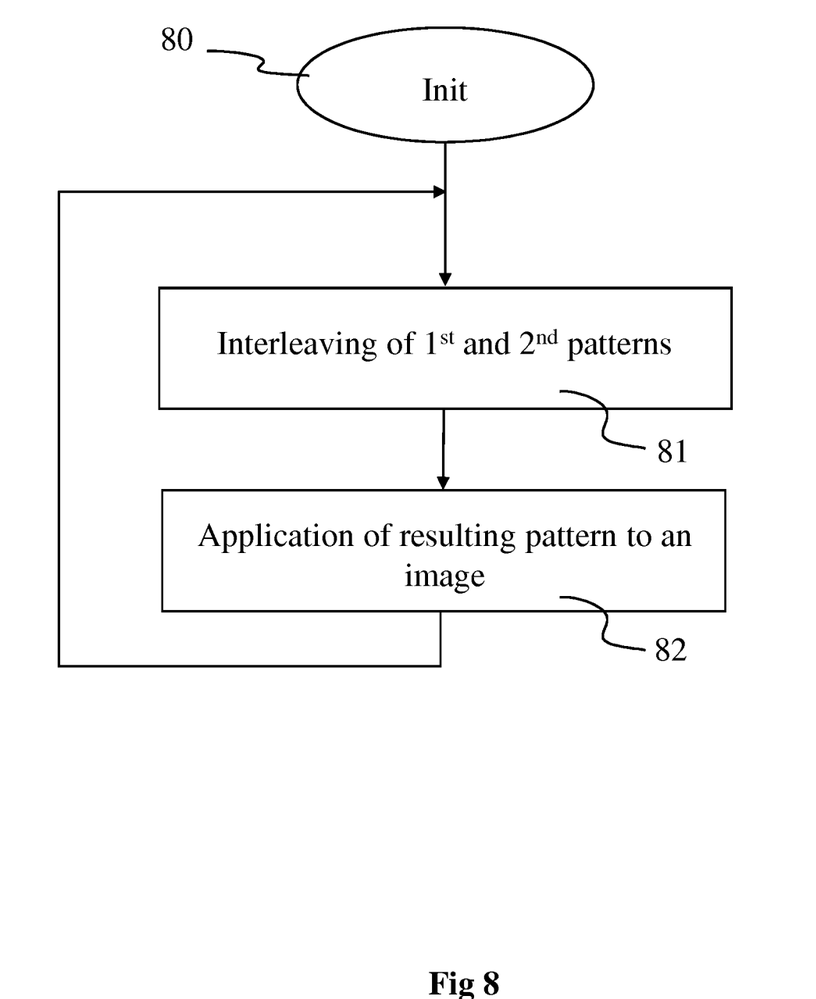
FIGS. 8 and 9 show a method for processing video images implemented in a processing unit of FIG. 2, 5 or 6, according to two particular embodiments of the invention.

FIG. 8 shows a method for processing video images implemented in a processing unit 2, 5 or 6, according to a non-restrictive particularly advantageous embodiment of the invention.

During an initialisation step 80, the different parameters of the processing unit are updated.

Then, during a step 81, a video pattern, called the third video pattern, is generated by spatial interleaving of a first video pattern and one or more second video patterns. Advantageously the spatial interleaving follows one or several determined interleaving sequences. Advantageously the third video pattern is generated in a way to conserve a luminous intensity of maximal value in one or several regions of the image (or in one region of one or several parts of the image) on which were applied the third video pattern and in a way to attenuate the luminous intensity in the rest of the image (or respectively in the rest of the part or part of the image). The area for which the luminous intensity conserves a maximal value corresponds advantageously to the centre of the image, that is to say for example to the pixel situated in the centre of the image or equally to the pixels distributed around the central pixel of the image. The area thus defined corresponds for example to a pixel, to a circle having a radius of several pixels and centred on the pixel of the centre of the image or to any geometric form centred on the pixel of the centre of the image. According to a variant, the regions for which the luminous intensity conserves a maximal value are two in number, for example each situated on a lateral side of the image, at the middle of the image. According to another variant, the regions for which the luminous intensity conserves a maximal value are three in number, with for example a region located at the centre of the image, the two others being located on the lateral sides of the image at the middle of the image.

Advantageously, the third video pattern is represented by a two dimensional matrix M*N comprising M×N elements. According to a variant, the number of elements of the matrix representative of the video pattern comprise as many elements as there are pixels in the images to be processed (for example 2073600 elements for a high definition resolution image 1920*1080). The video pattern is then of the same dimensions as the images to be processed. According to another particularly advantageous variant, the video pattern is of dimensions (or size) less than that of the images to be processed, that is to say it comprises a number of elements less than the number of pixels contained in the images to be processed.

The function representative of first and second video patterns are advantageously of Gaussian type, with for example as a formula:

$$f(x, y) = K \cdot \exp\left(-\left[\frac{(x-x_0)^2}{2\sigma_x^2} + \frac{(y-y_0)^2}{2\sigma_y^2}\right]\right)$$

where K is a determined coefficient, for example 255 corresponding to the maximal video level, x and y corresponding respectively to the abscissa and ordinate of an element of the video pattern, $x_0$ and $y_0$ corresponding respectively to the coordinates of the centre of the region in which the luminous intensity is conserved at it maximal value, $\sigma_x$ and $\sigma_y$ corresponding respectively to the variance in x and the variance in y of the Gaussian. According to a variant, the function representative of the first video pattern has a first coefficient K1 and the function representative of the second video pattern has a second coefficient K2 different to K1. According to another variant, the function representative of the first video pattern has a first standard deviation σ1 and the function representative of the second video pattern has a second standard deviation σ2 different to σ1. According to this variant, the functions of deviations types σ1 and σ2 have a same coefficient K or different coefficients K1 and K2.

According to variant, the functions used to generate the first and second video patterns are of bilinear type. The attenuation of the luminous intensity applied to the pixels of the image to be processed is even more significant as the pixel is far from the pixel or pixels of the area for which the luminous intensity is maximal and is proportional to the distance of the maximal luminous intensity area. This variant will be advantageously implemented in a processing unit 2.

Advantageously, the first and second video patterns have similar characteristics, that is to say they enable a luminous intensity of maximal value to be conserved in one or several same regions of the image (or in a same region of one or several parts of the image) on which will be applied the third video pattern and they enable the luminous intensity to be attenuated in the rest of the image (or respectively in the rest of the part or parts of the image) according to a same schema (for example in the same proportions with luminous intensity minima in the same points of the image. Hence, the third video pattern resulting from the interleaving of the first and or second video patterns will have characteristics similar to the first and second video patterns and coherencies (that is to say the luminous intensity will be maximal in a same region and the luminous intensity minima will be located in the same points as the first and second patterns).

The spatial interleaving of the first video pattern and of the second video patterns is advantageously carried out according to two spatial directions, a first direction in X corresponding to the columns of the display device on which the video processing is carried out and a second direction in Y corresponding to the line of the display device.

Then, during a step 82, the third video pattern is applied to each image of the video sequence, image by image. The pattern is applied to a source image at input to the processing unit and the resulting image has a luminous intensity equal to that of the source image in the region or regions in which the pattern presents a maximal video level and presents a reduced luminous intensity in the rest of the image, the reduction of luminous intensity with respect to the source image being linked to the values of elements comprised in the video pattern and applied to the pixels of the source image.

Figure 9:
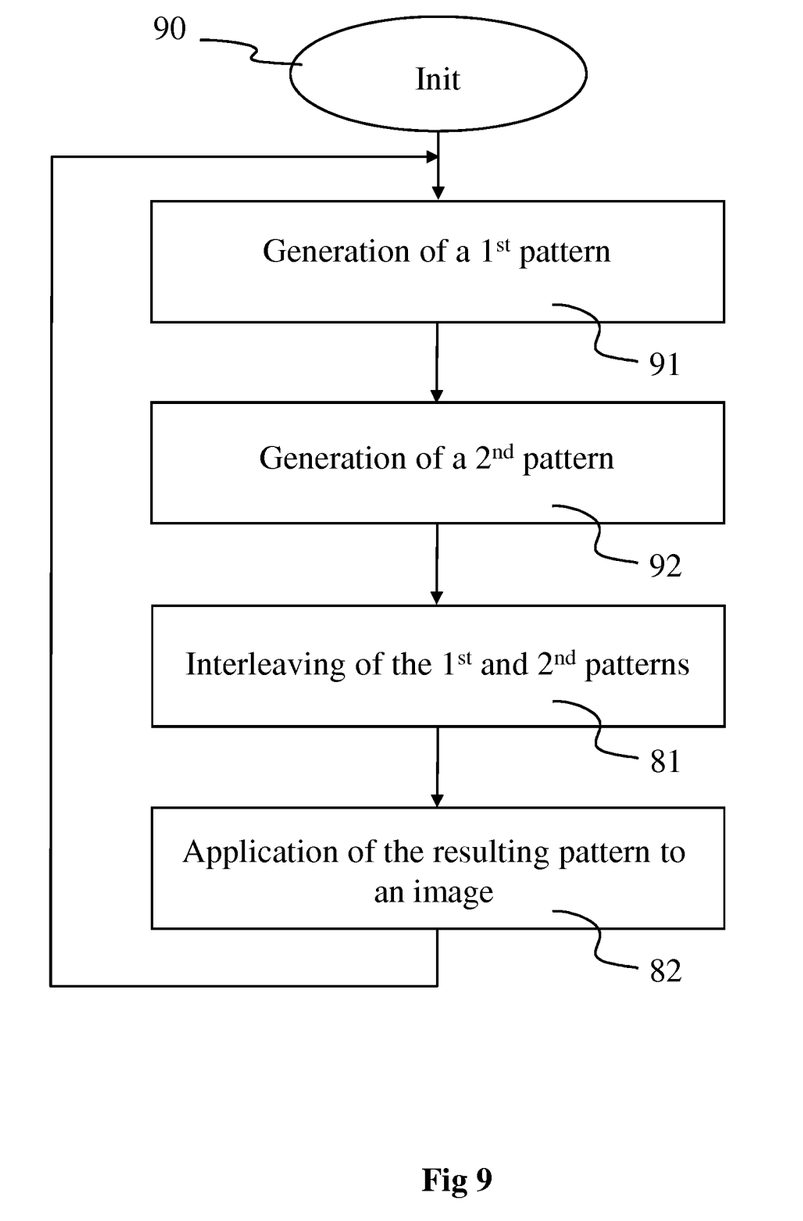

FIG. 9 shows a method for processing video images implemented in a processing unit 2, 5 or 6, according to a non-restrictive particularly advantageous embodiment of the invention.

During an initialisation step 90, the different parameters of the processing unit are updated.

Then, during a step 91, a first video pattern is generated according to a first attenuation function. The first attenuation function is advantageously of Gaussian type with a first standard deviation. According to a variant, the first attenuation function is of bilinear type. According to another variant, the first video pattern is generated from an initial video pattern. According to this variant, the first video pattern is equal to the initial video pattern weighted with a first weighting coefficient advantageously comprised between 0 and 1. According to a variant, the first weighting coefficient is equal to 1 and the first video pattern and the initial video pattern are identical.

Then, during a step 92, a second video pattern is generated according to a second attenuation function different from the first attenuation function. The second attenuation function is advantageously of Gaussian type with a second standard deviation different from the first standard deviation. According to a variant, the second attenuation function is of bilinear type. According to another variant, the second video pattern is generated from an initial video pattern. According to this variant, the second video pattern is equal to the initial video pattern weighted by a second weighting coefficient advantageously comprised between 0 and 1. The second weighting coefficient is advantageously different from the first weighting coefficient. Advantageously, several second video patterns are generated. Each second video pattern has a standard deviation different from that of other second video patterns. According to a variant, each second video pattern has a coefficient K different to that of other second video patterns with a same standard deviation or not.

Then during a step 81, a third video pattern is generated by spatial interleaving of the first video pattern with the second video pattern or second video patterns. This step 81 corresponds to step 81 described with regard to FIG. 8 and is not further described hereafter.

Then, during a step 82, the third video pattern is applied to at least one video image of a video sequence. This step 82 corresponds to step 82 described with regard to FIG. 8 and is not further described hereafter.

Naturally, the invention is not limited to the embodiments previously described.

In particular, the invention is not restricted to a method for processing images but extends to the processing unit implementing such a method and to the display device comprising a processing unit implementing the image processing method.

The is also not limited to the spatial interleaving of two video patterns but extends to the spatial interleaving of more than two video patterns, for example 3, 4, 5, 6 or 10 video patterns.

According to a variant, several video patterns generated from Gaussian functions of different standard deviations are each weighted by a plurality of weighting coefficients before being spatially overlapped according to a determined sequence to form an resulting video pattern, called the third video pattern.

According to an advantageous embodiment, the memory, the multiplier, the interpolation unit and the normalisation unit of the processing unit 2 are for example replaced by a LUT (Look-Up Table) correspondence table stored in a memory. The correspondence table is addressed with the position of the pixel of the image to be processed and with the RGB data of the pixel and provides directly at output an RGB value of the pixel, associated with the position of the pixel and its input RGB value, to be displayed in the output image after weighting by a weighting coefficient selected by the address decoder according to a determined sequence. Such an embodiment enables the hardware implementation of the processing unit to be simplified and enables the image processing to be accelerated.

The invention claimed is:

1. Method for processing an image from a video for a display device, wherein the method comprises a step of application of a plurality luminous intensity weighting coefficients to pixels of at least one part of the image in a way to conserve a maximum luminous intensity in at least one region of said at least one part of the image and to attenuate the luminous intensity in the rest of said at least one part of the image, said plurality luminous intensity weighting coefficients resulting from the spatial interleaving, according to a determined interleaving model, of a first set of weighting coefficients generated from a first attenuation function and at least one second set of weighting coefficients generated from at least one second attenuation function.

2. Method according to claim 1, wherein the first attenuation function is a first Gaussian type function having a first standard deviation.

3. Method according to claim 2, wherein the at least one second attenuation function corresponds to at least one second Gaussian type function having a second standard deviation different from said first standard deviation.

4. Method according to claim 1, wherein it comprises a step of generation of said first attenuation function and of said at least one second attenuation function from an initial attenuation function.

5. Method according to claim 4, wherein said first attenuation function and said at least one second attenuation function are generated by application of at least one weighting coefficient to said first initial attenuation function.

6. Method according to claim 1, wherein said spatial interleaving is carried out according to two dimensions, a first dimension corresponding to a first direction corresponding to columns of the display device and a second dimension corresponding to a second direction corresponding to lines of the display device.

7. Device for image processing comprising a processor adapted for the generation of a first attenuation function and at least one second attenuation function, wherein said device also comprises:

means for generating a plurality luminous intensity weighting coefficients resulting from the spatial interleaving, according to a determined interleaving model, of a first set of weighting coefficients generated from the first attenuation function and at least one second set of weighting coefficients generated from the at least one second attenuation function, said plurality luminous intensity weighting coefficients being generated in a way to conserve a maximum luminous intensity in at least one region of said at least one part of the image and to attenuate the luminous intensity in the rest of said at least one part of the image means for applying said plurality luminous intensity weighting coefficients to pixels of at least one part of the image.

8. Device according to claim 7, wherein the first attenuation function is a first Gaussian type function having a first standard deviation.

9. Device according to claim 7, wherein the at least one second attenuation function corresponds to at least one second Gaussian type function having a second standard deviation different from said first standard deviation.

10. Device according to claim 7, wherein said first attenuation function—and said at least one second attenuation function are generated from an initial attenuation function.

11. Device according to claim 10, wherein said first attenuation function and said at least one second attenuation function are generated by application of at least one weighting coefficient to said first initial attenuation function.

12. Device according to claim 7, wherein said spatial interleaving is carried out according to two dimensions, a first dimension corresponding to a first direction corresponding to columns of the display device and a second dimension corresponding to a second direction corresponding to lines of the display device.

* * * * *